United States Patent
Chang et al.

(10) Patent No.: US 11,532,836 B2
(45) Date of Patent: Dec. 20, 2022

(54) COMPOSITE ELECTROLYTE, LITHIUM METAL BATTERY COMPRISING THE SAME, AND METHOD OF PREPARING THE COMPOSITE ELECTROLYTE

(71) Applicants: Samsung Electronics Co., Ltd., Suwon-si (KR); Samsung SDI Co., Ltd., Yongin-si (KR)

(72) Inventors: Wonseok Chang, Seoul (KR); Victor Roev, Hwaseong-si (KR); Myungjin Lee, Seoul (KR); Hongsoo Choi, Seoul (KR); Seoksoo Lee, Yongin-si (KR); Dongmin Im, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 478 days.

(21) Appl. No.: 16/581,815

(22) Filed: Sep. 25, 2019

(65) Prior Publication Data
US 2020/0119395 A1   Apr. 16, 2020

(30) Foreign Application Priority Data

Oct. 12, 2018 (KR) .................. 10-2018-0122038
May 28, 2019 (KR) .................. 10-2019-0062580

(51) Int. Cl.
*H01M 10/052* (2010.01)
*H01M 10/0562* (2010.01)

(52) U.S. Cl.
CPC ..... *H01M 10/0562* (2013.01); *H01M 10/052* (2013.01); *H01M 2300/0065* (2013.01)

(58) Field of Classification Search
CPC ........... H01M 10/0562; H01M 10/052; H01M 2300/0065
See application file for complete search history.

(56) References Cited

U.S. PATENT DOCUMENTS

2017/0222244 A1* 8/2017 Kim .................. H01M 10/0525
2017/0263975 A1   9/2017 Anandan et al.

FOREIGN PATENT DOCUMENTS

| JP | 6114163 B2 | 4/2017 |
|----|------------|--------|
| KR | 1352904 B1 | 1/2014 |
| KR | 1020160014137 A | 2/2016 |
| KR | 1020160026648 A | 3/2016 |
| KR | 1020160121951 A | 10/2016 |
| KR | 20170092327 A | 8/2017 |
| KR | 20180032037 A | 3/2018 |
| KR | 1020180094184 A | 8/2018 |

OTHER PUBLICATIONS

Korean Office Action for Korean Patent Application No. 10-2019-0062580 dated Oct. 27, 2020.

* cited by examiner

*Primary Examiner* — Osei K Amponsah
(74) *Attorney, Agent, or Firm* — Cantor Colburn LLP

(57) ABSTRACT

A composite electrolyte including a lithium salt; a solid electrolyte wherein the solid electrolyte is a sulfide solid electrolyte, an oxide solid electrolyte, or a combination thereof; and an ionic liquid, wherein a mixture of the ionic liquid and the lithium salt has a dielectric constant of from about 4 to about 12, and an amount of halogen ions eluted from the composite electrolyte after immersion of the solid electrolyte in the ionic liquid for 24 hours is less than about 25 parts per million by weight, based on the total weight of the composite electrolyte, as measured by ion chromatography.

22 Claims, 6 Drawing Sheets

COMPOSITE ELECTROLYTE, LITHIUM METAL BATTERY COMPRISING THE SAME, AND METHOD OF PREPARING THE COMPOSITE ELECTROLYTE

CROSS-REFERENCE TO RELATED APPLICATION

This application claims priority to and the benefit of Korean Patent Application No. 10-2018-0122038, filed on Oct. 12, 2018, and Korean Patent Application No. 10-2019-0062580, filed on May 28, 2019, in the Korean Intellectual Property Office, and all the benefits accruing therefrom under 35 U.S.C. § 119, the entire contents of which are incorporated herein by reference.

BACKGROUND

1. Field

The present disclosure relates to composite electrolytes, lithium metal batteries including the same, and methods of preparing the composite electrolytes.

2. Description of the Related Art

Metal batteries, such as lithium metal batteries, generally include a lithium metal thin film as an anode. Such a lithium metal thin film is highly reactive to a liquid electrolyte during charging and discharging due to the high reactivity of lithium metal. Therefore, a liquid electrolyte can have low stability caused by its ease of ignition and leakage.

To improve electrolyte stability, significant attention has been directed to all-solid batteries which use a solid electrolyte that is a nonflammable material.

Sulfide or oxide materials can be used as solid electrolytes in all-solid batteries. A drawback in the use of a sulfide solid electrolyte can be reactions occurring at an interface between particles of a cathode active material and particles of the sulfide solid electrolyte, which may generate interfacial resistance at charging.

Therefore, recent attention has been directed to the use of composite electrolytes in which a solid electrolyte is mixed with a liquid electrolyte.

Many of the liquid electrolytes are polar organic solvents, and a chemical reaction may occur between the liquid electrolyte and a sulfide solid electrolyte in the composite electrolytes. As a result, the composite electrolytes can lose ionic conductivity and cause a deterioration of cell performance.

Thus, there remains a need for an improved composite electrolyte, a lithium metal battery including the same, and a method of preparing the composite electrolyte.

SUMMARY

Provided are composite electrolytes.

Provided are lithium metal batteries including the composite electrolytes.

Provided are methods of preparing the composite electrolytes.

Additional aspects will be set forth in part in the description which follows and, in part, will be apparent from the description, or may be learned by practice of the presented embodiments.

According to an aspect of an embodiment, a composite electrolyte includes: a lithium salt; a solid electrolyte, wherein the solid electrolyte is a sulfide solid electrolyte, an oxide solid electrolyte, or a combination thereof; and an ionic liquid, wherein a mixture of the ionic liquid and the lithium salt includes a dielectric constant of from about 4 to about 12, and an amount of halogen ions eluted from the composite electrolyte after immersion of the solid electrolyte in the ionic liquid for 24 hours is less than about 25 parts per million (ppm) by weight, based on the total weight of the composite electrolyte, as measured by ion chromatography.

According to an aspect of another embodiment, a lithium metal battery includes: a composite cathode including a cathode current collector and a cathode active material layer, wherein the cathode active material layer is disposed on the cathode current collector and includes a cathode active material and the composite electrolyte; a lithium anode including lithium metal or a lithium alloy; and a composite electrolyte layer interposed between the cathode active material layer and the lithium anode, and including a lithium salt, an ionic liquid, and a solid electrolyte, wherein the solid electrolyte is a sulfide solid electrolyte, an oxide solid electrolyte, or a combination thereof.

According to an aspect of another embodiment, a method of preparing the composite electrolyte includes combining a lithium salt, a solid electrolyte; and an ionic liquid, wherein the solid electrolyte is a sulfide solid electrolyte, an oxide solid electrolyte, or a combination thereof.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
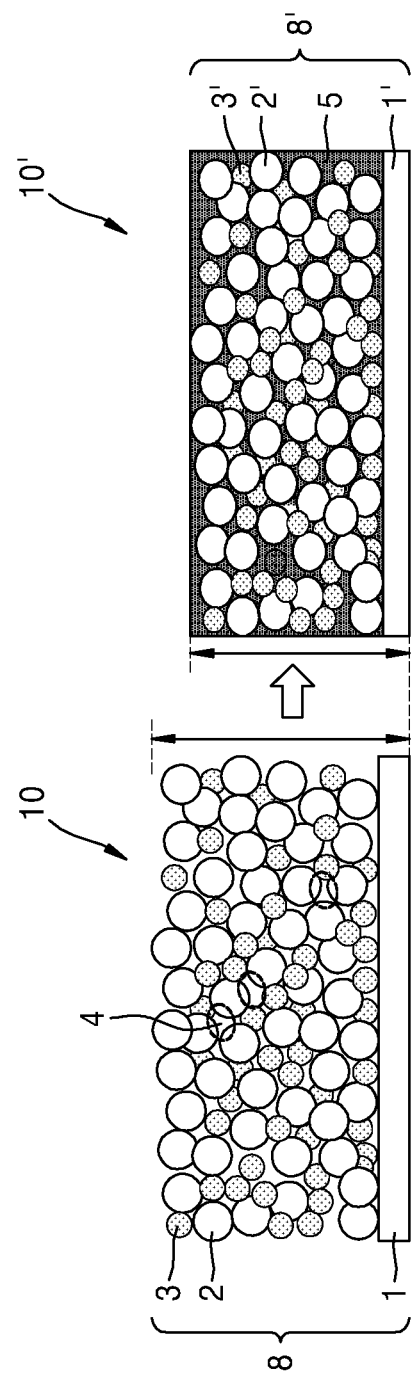
FIG. 1 is a schematic view illustrating a structure of a composite cathode of a lithium metal battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). Disclosure of a narrower range or more specific group in addition to a broader range is not a disclaimer of the broader range or larger group. When a range is described as "less than" a specified endpoint, the limitation can be construed as greater than 0 to less than the specified endpoint (e.g., "less than 10 ppm" is inclusive of "greater than 0 to less than 10 ppm", etc.).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The term "C-rate" is a measure of the rate at which a battery is charged or discharged relative to its maximum capacity. A 1C rate, or a constant current of 1C, means that the charge/discharge current will charge/discharge the entire battery in 1 hour.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite electrolyte, a lithium metal battery including the same, and a method of preparing the composite electrolyte according to one or more embodiments of the present disclosure will be described with reference to the accompanying drawings in detail.

Research has been conducted into lithium metal batteries having a structure in which a liquid electrolyte is filled in a cell formed of a solid electrolyte that is an inorganic material during the manufacture of the cell to improve ionic conductivity. This structure of the lithium metal battery may increase capacity of the cell and improve high-rate characteristics by filling voids, which have not been filled with the solid electrolyte, with the liquid electrolyte.

However, when a sulfide solid electrolyte is used as the solid electrolyte of the lithium metal battery, halogen ions added to improve ionic conductivity may partially be eluted due to reactions between the solid electrolyte and a polar organic solvent, thereby deteriorating ionic conductivity of the solid electrolyte.

Although attempts have been made to introduce a lithium salt in a high concentration to prevent deterioration of ionic conductivity, these attempts are limited.

The present inventors have developed a novel composite electrolyte in consideration therewith.

The composite electrolyte according to an embodiment includes a lithium salt, a solid electrolyte, wherein the solid electrolyte is a sulfide solid electrolyte, an oxide solid electrolyte, or a combination thereof, and an ionic liquid. A mixture of the ionic liquid and the lithium salt may have a dielectric constant of from about 4 to about 12, and an amount of halogen ions eluted from the composite electrolyte after immersion of the solid electrolyte in the ionic liquid for 24 hours may be less than about 25 parts per million (ppm) by weight, based on the total weight of the composite electrolyte, as measured by ion chromatography. In other words, 24 hours after the composite electrolyte is assembled, the amount of halogen ions present from the composite electrolyte may be less than about 25 ppm.

The amount of halogen ions eluted from the composite electrolyte may be measured by ion chromatography, for example after immersing the solid electrolyte in the ionic liquid for 24 hours, to be less than about 25 ppm by weight, based on the total weight of the composite electrolyte. For example, the amount of halogen ions eluted from the composite electrolyte may be less than about 20 ppm by weight, or less than about 18 ppm by weight, or less than about 15 ppm by weight, or less than about 12 ppm by weight, or less than about 10 ppm, or less than about 8 ppm by weight, or less than about 5 ppm by weight, or less than about 3 ppm by weight, based on the total weight of the composite electrolyte. Any ion chromatography method or apparatus available in the art may be used.

About 14% of the volume of the composite electrolyte consists of pores or voids that are formed in the composite electrolyte during a manufacturing process of a battery including the composite electrolyte. These pores or voids may prevent or limit lithium ions from moving, thereby deteriorating ionic conductivity of the composite electrolyte. When a polar organic solvent is used to prevent deterioration of ionic conductivity, elution of halogen ions may deteriorate ionic conductivity as described above. The composite electrolyte according to an embodiment may maintain or improve ionic conductivity by forming a stable contact interface between an electrode and the solid electrolyte by impregnating the solid electrolyte with an ionic liquid having low chemical reactivity with the solid electrolyte.

The mixture of the ionic liquid and the lithium salt may have a dielectric constant of from about 4 to about 12. For example, the mixture of the ionic liquid and the lithium salt may have a dielectric constant of from about 4 to about 11. For example, the mixture of the ionic liquid and the lithium salt may have a dielectric constant of from about 4 to about 10. The mixture of the ionic liquid and the lithium salt, which has a lower dielectric constant than the mixtures of ionic liquids according to the related art having an imidazolium cation and lithium salts, may have lower reactivity with the solid electrolyte.

The amount of halogen ions eluted from the composite electrolyte may be less than about 25 ppm by weight, based on the total weight of the composite electrolyte. Different from electrolytes or composite electrolytes according to the related art, the composite electrolyte may reduce the amount of eluted halogen ions, and thus ionic conductivity may be maintained or improved.

The amount of the lithium salt contained in the composite electrolyte may be 1 mole per liter (M) or greater. For example, the amount of the lithium salt contained in the composite electrolyte may be from about 1 M to about 4 M. When the amount of the lithium salt is within these ranges, mobility of lithium ions may be increased in the composite electrolyte, and thus ionic conductivity may be improved.

The lithium salt may include LiSCN, LiN(CN)$_2$, Li(CF$_3$SO$_2$)$_3$C, LiC$_4$F$_9$SO$_3$, LiN(SO$_2$CF$_2$CF$_3$)$_2$, LiCl, LiF, LiBr, LiI, LiB(C$_2$O$_4$)$_2$ (lithium bis(oxalato) borate, LiBOB), LiBF$_4$, LiBF$_3$(C$_2$F$_5$), LiBF$_2$(C$_2$O$_4$) (lithium difluoro(oxalato)borate, LiDFOB), LiN(SO$_2$CF$_3$)$_2$ (lithium bis(trifluoromethanesulfonyl)imide, LiTFSI), LiN(SO$_2$F)$_2$ (lithium bis(fluorosulfonyl)imide, LiFSI), LiCF$_3$SO$_3$, LiAsF$_6$, LiSbF$_6$, LiClO$_4$, or a combination thereof. For example, the lithium salt may be a lithium imide salt. Examples of the lithium imide salt may include lithium bis(trifluoromethanesulfonyl)imide (LiTFSI, LiN(SO$_2$CF$_3$)$_2$) and lithium bis(fluorosulfonyl)imide (LiFSI, LiN(SO$_2$F)$_2$). Since the lithium salt appropriately maintains chemical reactivity with the ionic liquid, ionic conductivity may be maintained or improved.

A weight ratio of the solid electrolyte to the ionic liquid may be from about 0.1:99.9 to about 90:10. For example, the weight ratio of the solid electrolyte to the ionic liquid may be from about 10:90 to about 90:10. For example, the weight ratio of the solid electrolyte to the ionic liquid may be from about 20:80 to about 90:10. For example, the weight ratio of the solid electrolyte to the ionic liquid may be from about 30:70 to about 90:10. For example, the weight ratio of the solid electrolyte to the ionic liquid may be from about 40:60 to about 90:10. For example, the weight ratio of the solid electrolyte to the ionic liquid may be from about 50:50 to about 90:10. When the weight ratio is within the ranges above, the composite electrolyte enlarges or increases an electrochemical contact area with the electrode, thereby maintaining or improving ionic conductivity. A battery including the composite electrolyte may have high energy density, high capacity, and excellent high-rate characteristics.

The sulfide solid electrolyte may include a solid electrolyte represented by Formula 1 below.

$$Li_aM_bPS_cA_d \qquad \text{Formula 1}$$

In Formula 1, 0<a≤6, 0≤b≤6, 0<c<6, and 0≤d≤6; M may be Ge, Sn, or Si; an A may be F, Cl, Br, or I.

Since the solid electrolyte represented by Formula 1 has a high ionic conductivity similar to an ionic conductivity of liquid electrolytes according to the related art which is in a range of from about $10^{-2}$ Siemens per centimeter (S/cm) to about $10^{-3}$ S/cm at room temperature, a composite electrolyte including the solid electrolyte may have improved ionic conductivity.

Optionally, the sulfide solid electrolyte may include a solid electrolyte including sulfur and lithium and further including an element that is phosphorus (P), silicon (Si), boron (B), aluminum (Al), germanium (Ge), zinc (Zn), gallium (Ga), indium (In), tin (Sn), fluorine (F), chlorine (Cl), bromine (Br), iodine (I), or a combination thereof. The solid electrolyte may include a compound that is lithium sulfide, silicon sulfide, phosphorous sulfide, boron sulfide, or a combination thereof. The solid electrolyte may improve electrochemical stability.

For example, the sulfide solid electrolyte may further include a sulfide in the form of thio-LISICON such as Li$_{10}$GeP$_2$S$_{12}$. The composite electrolyte may have further improved ionic conductivity by including the sulfide in the form of thio-LISICON.

For example, the oxide solid electrolyte may include Li$_{1+x}$Ti$_{2-x}$Al(PO$_4$)$_3$ (LTAP, wherein 0≤x≤4), Li$_{1+x+y}$Al$_x$Ti$_{2-x}$Si$_y$P$_{3-y}$O$_{12}$ (wherein 0<x<2 and 0≤y<3), BaTiO$_3$, Pb(Zr$_{1-a}$Ti$_a$)O$_3$ (PZT, wherein 0≤a≤1), Pb$_{1-x}$La$_x$Zr$_{1-y}$Ti$_y$O$_3$ (PLZT, wherein 0≤x<1 and 0≤y<1), Pb(Mg$_{1/3}$Nb$_{2/3}$)O$_3$—PbTiO$_3$ (PMN-PT), HfO$_2$, SrTiO$_3$, SnO$_2$, CeO$_2$, Na$_2$O, MgO, NiO, CaO, BaO, ZnO, ZrO$_2$, Y$_2$O$_3$, Al$_2$O$_3$, TiO$_2$, SiO$_2$, lithium phosphate (Li$_3$PO$_4$), lithium titanium phosphate (Li$_x$Ti$_y$(PO$_4$)$_3$, wherein 0<x<2 and 0<y<3), lithium aluminum titanium phosphate (Li$_x$Al$_y$Ti$_z$(PO$_4$)$_3$, wherein 0<x<2, $0<y<1$, and $0<z<3$), $Li_{1+x+y}(Al_{1-a}Ga_a)_x(Ti_bGe_{1-b})_{2-x}Si_yP_{3-y}O_{12}$ (wherein $0\le a\le 1$, $0\le b\le 1$, $0\le x\le 1$, and $0\le y\le 1$), lithium lanthanum titanate ($Li_xLa_yTiO_3$, wherein $0<x<2$ and $0<y<3$), $Li_2O$, $LiAlO_2$, $Li_2O$—$Al_2O_3$—$SiO_2$—$P_2O_5$—$TiO_2$—$GeO_2$ ceramics, Garnet ceramics ($Li_{3+x}La_3M_2O_{12}$, wherein M is Te, Nb, or Zr), or a combination thereof. The oxide solid electrolyte may further include any oxide inorganic particles and/or oxide solid electrolyte each available in the art in addition to the afore-mentioned oxide solid electrolyte.

The ionic liquid may include a heterocyclic cationic compound having a saturated 5-membered ring to 12-membered ring, including a heteroatom in the heterocyclic ring, wherein the heteroatom is nitrogen (N), phosphorus (P), arsenic (As), or a combination thereof. The ionic liquid may decrease chemical reactivity with the sulfide solid electrolyte. In comparison, an ionic liquid including a cation having an unsaturated 5-membered to 12-membered heterocyclic ring as a core is decomposed as a result of reactions with the sulfide solid electrolyte. Accordingly, a composite electrolyte including the same may have reduced ionic conductivity.

For example, the ionic liquid may include a cation represented by Formula 2, Formula 3, or a combination thereof.

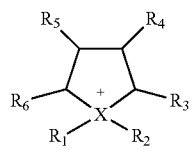

Formula 2

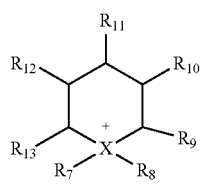

Formula 3

In Formulae 2 and 3, X may be independently N or P; $R_1$, $R_2$, $R_7$, and $R_8$ may each independently be a substituted or unsubstituted C1-C30 alkyl group or a substituted or unsubstituted C2-C20 alkenyl group; $R_3$, $R_4$, $R_5$, $R_6$, $R_9$, $R_{10}$, $R_{11}$, $R_{12}$, and $R_{13}$ may each independently be hydrogen, halogen, a hydroxyl group, a cyano group, —C(=O)$R_a$, —C(=O)=OR$_a$, —OCO(OR$_a$), —C=N(R$_a$), —SR$_a$, —S(=O)R$_a$, —S(=O)$_2$R$_a$, —OR$_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or any combination thereof, wherein each $R_a$ is independently hydrogen, a C1-C10 alkyl group, or a C6-C20 aryl group; and at least one of $R_1$ and $R_2$ is an unsubstituted C1-C10 alkyl group, and at least one of $R_7$ and $R_8$ is an unsubstituted C1-C10 alkyl group.

For example, in Formulae 2 and 3, at least one of $R_1$ and $R_2$ may be an unsubstituted C3-C10 alkyl group, and at least one of $R_7$ and $R_8$ is an unsubstituted C3-C10 alkyl group.

The term "substituted" used in Formulae 2 and 3 indicates that at least one hydrogen atom of a functional group is substituted with a halogen atom, a C1-C10 alkyl group substituted with a halogen atom (e.g., $CF_3$, $CHF_2$, $CH_2F$, $CCl_3$, or the like), a C1-C20 alkoxy group, a C2-C20 alkoxyalkyl group, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen" includes F, Br, Cl, and I.

The term "alkyl" refers to completely saturated, branched or unbranched (or straight-chain or linear) monovalent hydrocarbon group. Examples of "alkyl" may include, but are not limited to, methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl. The term "alkylene" refers to a divalent alkyl group.

The term "alkoxy" refers to an alkyl group linked to an oxygen atom. Examples of the "alkoxy" may include, but are not limited to, methoxy, ethoxy, and propoxy.

The term "alkenyl" refers to a branched or unbranched hydrocarbon group having at least one carbon-carbon double bond. Examples of the alkenyl group may include, but are not limited to, vinyl, allyl, butenyl, isopropenyl, or isobutenyl.

The term "alkynyl" refers to a branched or unbranched hydrocarbon group having at least one carbon-carbon triple bond. Examples of the "alkynyl" may include, but are not limited to, ethynyl, butynyl, isobutynyl, and isopropynyl.

The term "cycloalkyl" refers to a monovalent non-aromatic group, generally saturated, in the form of a monocyclic or bicyclic hydrocarbon group including 3 to 10 carbon atoms. Examples of the "cycloalkyl" may include, but are not limited to, cyclopropyl, cyclobutyl, cyclopentyl, cyclohexyl, and cyclooctyl.

The term "aryl" refers to an aromatic group in which an aromatic ring includes at least one carbocyclic ring. Examples of the "aryl" may include, but are not limited to, phenyl, naphthyl, and tetrahydronaphthyl.

The term "aryloxy" refers to a monovalent radical in the form of Ar—O, where Ar is an aryl group. Examples of the "aryloxy" may include, but are not limited to, phenoxy.

The term "heteroaryl" refers to a monocyclic or bicyclic aromatic group wherein at least one ring atom is a hetero atom selected from N, O, P, and S, with the remaining ring atoms being carbon atoms. For example, the "heteroaryl" group may include 1 to 5 hetero atoms and 5 to 10 ring members. Here, S or N may be oxidized to form various oxidized states.

Examples of the "heteroaryl" may include, but are not limited to, thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, pyrazin-2-yl, pyrazin-4-yl, pyrazin-5-yl, pyrimidin-2-yl, pyrimidin-4-yl, and pyrimidin-5-yl.

The term "carbocyclic" as used herein refers to saturated or partially unsaturated non-aromatic monocyclic, bicyclic or tricyclic hydrocarbon groups. Non-limiting examples of the monocyclic hydrocarbon groups include cyclopentyl, cyclopentenyl, cyclohexyl, and cyclohexenyl. Non-limiting examples of the bicyclic hydrocarbon groups include bornyl, decahydronaphthyl, bicyclo[2.1.1]hexyl, bicyclo[2.2.1]heptyl, bicyclo[2.2.1]heptenyl, and bicyclo[2.2.2]octyl. The tricyclic hydrocarbon groups may be, for example, adamantyl and the like.

The term "heterocyclic" as used herein refers to a cyclic group having at least one heteroatom and 5 to 20 carbon atoms, for example, 5 to 10 carbon atoms. In this regard, the heteroatom may be one selected from sulfur, nitrogen, oxygen, and boron.

For example, the anion of the ionic liquid may include $BF_4^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_3C^-$, $NO_3^-$, $CH_3COO^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $C_2N_3^-$, and $(O(CF_3)_2C_2(CF_3)_2O)_2PO^-$, $(FSO_2)_2N^-$, $(CF_3SO_2)_2N^-$, or any mixture thereof.

The composite electrolyte may further include a liquid electrolyte, a polymer ionic liquid, or a combination thereof.

The liquid electrolyte may include a lithium salt and an organic solvent. The organic solvent may be a carbonate solvent, an ester solvent, an ether solvent, a ketone solvent, an amine solvent, or a phosphine solvent. For example, the organic solvent may include ethylene carbonate, propylene carbonate, dimethyl carbonate, diethyl carbonate, ethylmethyl carbonate, fluoroethylene carbonate, gamma-butyrolactone, dimethoxyethane, diethoxyethane, diethylene glycol dimethyl ether, triethylene glycol dimethylether, tetraethylene glycol dimethyl ether, polyethylene glycol dimethyl ether, succinonitrile, sulfolane, dimethylsulfone, ethylmethylsulfone, diethylsulfone, adiponitrile, 1,1,2,2-tetrafluoroethyl-2,2,3,3-tetrafluoropropyl ether, or a combination thereof. For example, the organic solvent may include dimethoxyethane, diethoxyethane, diethylene glycol dimethyl ether, triethylene glycol dimethyl ether, tetraethylene glycol dimethyl ether, polyethylene glycol dimethyl ether, 1,1,2,2-tetrafluoroethyl-2,2,3,3-tetrafluoropropyl ether, or a combination thereof.

The polymer ionic liquid may be a polymer obtained by polymerizing an ionic liquid monomer or a compound in a polymer form. The polymer ionic liquid has high solubility in an organic solvent and may further improve ionic conductivity when added to an electrolyte. When the polymer ionic liquid is obtained by polymerizing the ionic liquid monomer, a polymerization product may be washed and dried, and then subjected to anion substitution to have an anion to be dissolved in an organic solvent.

The polymer ionic liquid may include a repeating unit including a cation such as an ammonium cation, a pyrrolidium cation, a piperidinium cation, an imidazolium cation, a pyrazolium cation, an oxazolium cation, a pyridazinium cation, a phosphonium cation, a sulfonium cation, a triazolium cation, or a combination thereof, and an anion such as $BF_4^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

Alternatively, the polymer ionic liquid may be prepared via polymerization of an ionic liquid monomer(s). The ionic liquid monomer may have a polymerizable functional group such as a vinyl group, an allyl group, an acrylate group, and a methacrylate group and also have a cation that is, for example, an ammonium cation, a pyrrolidium cation, a piperidinium cation, or the like, or a combination thereof, and any of the above-mentioned anions.

For example, the polymer ionic liquid may be a compound represented by Formula J or a compound represented by Formula K.

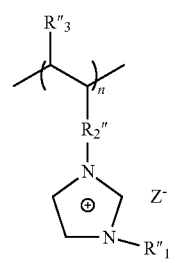

Formula J

In Formula J, $R''_1$ and $R''_3$ may each independently be hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group, $R''_2$ may be a simple chemical bond, a C1-C30 alkylene group, a C6-C30 arylene group, a C2-C30 heteroarylene group, or a C4-C30 divalent carbocyclic group, $Z^-$ may be an anion of the polymer ionic liquid, and n may be about 500 to about 2800.

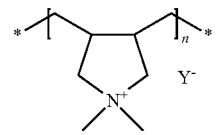

Formula K

In Formula K, $Y^-$ is defined the same as $Z^-$ of Formula J, and n may be from about 500 to about 2800.

In Formula K, $Y^-$ may be, for example, bis(trifluoromethanesulfonyl)imide (TFSI), bis(fluorosulfonyl)imide, $BF_4^-$, or $CF_3SO_3^-$.

Examples of the compound represented by Formula K above may include poly(diallyldimethyl ammonium bis(trifluoromethanesulfonyl)imide).

The substitution and functional groups used in the compounds represented by Formulae J and K are as defined above, and thus detailed descriptions thereof will not be given.

A lithium metal battery according to another embodiment includes: a composite cathode including a cathode current collector and a cathode active material layer disposed on the current collector and including a cathode active material and the above-mentioned composite electrolyte; a lithium anode including lithium metal or a lithium alloy; and a composite electrolyte layer interposed between the cathode active material layer and the lithium anode, and including a lithium salt, an ionic liquid, and a solid electrolyte, wherein the solid electrolyte is a sulfide solid electrolyte, an oxide solid electrolyte, or a combination thereof.

Since the lithium metal battery includes the ionic liquid having decreased chemical reactivity with the above-described composite electrolyte, a stable contact interface may be formed between the composite cathode and the composite electrolyte layer and a sufficient interfacial area may be obtained. As a result, a sufficient pathway of lithium ions is obtained in the lithium metal battery, and thus ionic conductivity may be maintained or improved. Energy density and discharge capacity of the lithium metal battery may be increased, and furthermore, high-rate characteristics and lifespan characteristics may also be improved.

Cathode Active Material Layer

In the cathode active material layer, an amount of the cathode active material may be about 60 parts by weight or greater based on 100 parts by weight of the cathode active material layer. For example, in the cathode active material layer, the amount of the cathode active material may be from about 60 parts by weight to about 90 parts by weight based on 100 parts by weight of the cathode active material layer. When the cathode active material layer includes the sufficient amount of the cathode active material within the ranges above, a lithium metal battery including the cathode active material layer may have a high mixture density and a high energy density.

Any compound allowing intercalation/deintercalation of lithium ions used in the art may be used as the cathode active material without limitation.

Examples of the compound allowing intercalation/deintercalation of lithium ions may include one of the compounds represented by the following formulae: $Li_aA'_{1-b}B'_bD'_2$ (wherein $0.90 \leq a \leq 1.8$ and $0 \leq b \leq 0.5$); $Li_aE'_{1-b}B'_bO_{2-c}D'_c$ (wherein $0.90 \leq a \leq 1.8$, $0 \leq b \leq 0.5$, and $0 \leq c \leq 0.05$); $LiE'_{2-b}B'_bO_{4-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE'_cG'_dO_2$ (wherein $0.9 \leq a \leq 1.8$, $0 \leq b \leq 0.9$, $0 \leq c \leq 0.5$, and $0.001 \leq d \leq 0.1$); $Li_aNi_bCo_cMn_dG'_eO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG'_bO_2$ (wherein $0.90 \leq a \leq 1.8$ and $0.001 \leq b \leq 0.1$); $Li_aCoG'_bO_2$ (wherein $0.90 \leq a \leq 1.8$ and $0.001 \leq b \leq 0.1$); $Li_aMnG'_bO_2$ (wherein $0.90 \leq a \leq 1.8$ and $0.001 \leq b \leq 0.1$); $Li_aMn_2G'_bO_4$ (wherein $0.90 \leq a \leq 1.8$ and $0.001 \leq b \leq 0.1$); $Q'O_2$; $Q'S_2$; $LiQ'S_2$; $V_2O_5$; $LiV_2O_5$; $LiI'O_2$; $LiNiVO_4$; $Li_{(3-f)}J'_2(PO_4)_3$ (wherein $0 \leq f \leq 2$); $Li_{(3-f)}Fe_2(PO_4)_3$ (wherein $0 \leq f \leq 2$); and $LiFePO_4$.

In the above formulae, A' may be Ni, Co, Mn, or any combination thereof; B' may be Al, Ni, Co, Mn, Cr, Fe, Mg, Sr, V, a rare earth element, or any combination thereof; D' may be O, F, S, P, or any combination thereof; E' may be Co, Mn, or any combination thereof; F' may be F, S, P, or any combination thereof; G' may be Al, Cr, Mn, Fe, Mg, La, Ce, Sr, V, or any combination thereof; Q' may be Ti, Mo, Mn, or any combination thereof; I' may be Cr, V, Fe, Sc, Y, or any combination thereof; and J' may be V, Cr, Mn, Co, Ni, Cu, or any combination thereof.

The compounds listed above may have a coating layer on the surface thereof or a mixture of a compound with no coating layer and a compound having a coating layer may also be used. The coating layer may include a compound of a coating element, such as an oxide, hydroxide, oxyhydroxide, oxycarbonate, or hydroxycarbonate of the coating element. The compound constituting the coating layer may be amorphous or crystalline. Examples of the coating element contained in the coating layer may be Mg, Al, Co, K, Na, Ca, Si, Ti, V, Sn, Ge, Ga, B, As, Zr, or a combination thereof. Any coating method, which does not adversely affect physical properties of the cathode active material (e.g., spray coating and dipping), may be used as a process of forming the coating layer. These methods are obvious to those of ordinary skill in the art, and thus detailed descriptions thereof will not be given.

For example, the cathode active material may be a nickel composite oxide including 60 wt % or more of nickel such as lithium nickel cobalt manganese oxide or lithium nickel cobalt aluminum oxide. These nickel-containing cathode active materials may easily have ionic conductivity since resistive elements are not generated between the nickel-containing cathode active materials and the sulfide solid electrolyte.

For example, the cathode active material may be a lithium cobalt oxide ($LiCoO_2$) having a high true density and a high diffusion velocity of lithium ions in addition to the nickel composite oxide. For example, the cathode active material may be a composite cathode active material prepared by coating the lithium cobalt oxide with a nickel composite oxide, $LiNbO_2$, $Li_4Ti_5O_{12}$, an aluminum oxide, or the like.

In the cathode active material layer, an amount of the composite electrolyte may be about 5 parts by weight or greater based on 100 parts by weight of the cathode active material layer. For example, in the cathode active material layer, the amount of the composite electrolyte may be about 6 parts by weight or greater based on 100 parts by weight of the cathode active material layer. For example, in the cathode active material layer, the amount of the composite electrolyte may be about 7 parts by weight or greater based on 100 parts by weight of the cathode active material layer. For example, in the cathode active material layer, the amount of the composite electrolyte may be about 8 parts by weight or greater based on 100 parts by weight of the cathode active material layer. For example, in the cathode active material layer, the amount of the composite electrolyte may be about 40 parts by weight or less based on 100 parts by weight of the cathode active material layer. For example, the amount of the composite electrolyte may be about 5 to about 40 parts by weight, or about 6 to about 40 parts by weight, or about 7 to about 40 parts by weight, or about 8 to about 40 parts by weight, based on 100 parts by weight of the cathode active material layer.

The cathode active material layer may further include a conducting agent, a binder, or both the conducting agent and the binder.

The conducting agent may be, but is not limited to, carbon black, graphite, natural graphite particulates, artificial graphite, acetylene black, Ketjen black, carbon fibers, or carbon nanotubes; metals such as copper, nickel, aluminum, and silver in a powder, fiber, or tube form; or conductive polymer such as polyphenylene derivatives, or any conductive material available in the art may also be used.

The binder may be, but is not limited to, polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, or an ethylene-acrylic acid copolymer, each of which may be used alone or in combination with each other, and any binder available in the art may also be used.

Amounts of the conductive material and the binder may be the same amounts as those used in lithium metal batteries.

FIG. 1 is a schematic diagram illustrating composite cathodes 10 and 10' of a lithium metal battery according to an embodiment. The composite cathode 10 illustrates the case before an ionic liquid is added, whereas the composite cathode 10' illustrates the case after the ionic liquid is added.

Referring to FIG. 1, the composite cathode 10 or 10' includes a cathode current collector 1 or 1' and a cathode active material layer 8 or 8' that includes a plurality of particles of a cathode active material 2 or 2' and a plurality of particles of a solid electrolyte 3 or 3', which is selected from a sulfide solid electrolyte and oxide solid electrolyte, both disposed on the cathode current collector 1 or 1', respectively. In the composite cathode 10, there are a plurality of pores 4 located between adjacent particles of the cathode active material 2 or 2', between adjacent particles of the cathode active material 2 or 2' and particles of the solid electrolyte 3 or 3', between adjacent particles of the solid electrolyte 3 or 3', or a combination thereof. In the composite cathode 10', at least one of the pores 4 is filled with an ionic liquid 5. In other words, the ionic liquid is disposed in at least one pore between the adjacent particles of the cathode active material, in at least one pore between the adjacent particles of the cathode active material and particles of the solid electrolyte, in at least one pore between the adjacent particles of the solid electrolyte, or a combination thereof. The term "pores" refers to pores, spaces, or voids formed between mixed particles of the cathode active material particles 2 and the solid electrolyte particles 3. In an embodiment, substantially all of the pores 4 of composite cathode 10 are filled (e.g., contain) with the ionic liquid 5 to provide the composite cathode 10'.

The ionic liquid 5 filled or disposed in the pores 4 may reduce or prevent the formation of a resistive layer caused by reactions (side reactions) among transition metal elements present on surfaces of particles of the cathode active materials 2 and 2', oxygen, and sulfur present on surfaces of particles of the sulfide solid electrolytes 3 and 3'. Thus, a pathway of lithium ions may be established, and ionic conductivity of a lithium metal battery including the same may be maintained or improved.

In the cathode active material layer of the composite cathode, the ionic conductivity of the composite electrolyte may decrease by about 15% or less, relative to initial ionic conductivity, after being maintained for 100 hours. As used herein, the term "maintained" means held at an open circuit voltage. The measure of decrease in ionic conductivity may be expressed as an ionic conductivity reduction ratio (%) according to Equation 1.

Ionic conductivity reduction ratio (%)=[(initial ionic conductivity−ionic conductivity after being maintained for 100 hours)/(initial ionic conductivity)]×100%        Equation 1

Composite Electrolyte Layer

The composite electrolyte layer includes a lithium salt, an ionic liquid, and a solid electrolyte that is a sulfide solid electrolyte, an oxide solid electrolyte, or a combination thereof.

In the composite electrolyte layer, an amount of the ionic liquid may be less than about 50 parts by weight based on 100 parts by weight of the composite electrolyte layer.

Since compositions of the sulfide solid electrolyte and the oxide solid electrolyte included in the composite electrolyte layer are as described above, detailed descriptions thereof will not be given.

In the composite electrolyte layer, the lithium salt may include LiSCN, LiN(CN)$_2$, Li(CF$_3$SO$_2$)$_3$C, LiC$_4$F$_9$SO$_3$, LiN(SO$_2$CF$_2$CF$_3$)$_2$, LiCl, LiF, LiBr, LiI, LiB(C$_2$O$_4$)$_2$ (lithium bis(oxalato) borate, LiBOB), LiBF$_4$, LiBF$_3$(C$_2$F$_5$), LiBF$_2$(C$_2$O$_4$) (lithium difluoro(oxalato) borate, LiDFOB), LiN(SO$_2$CF$_3$)$_2$ (lithium bis(trifluoromethanesulfonyl)imide, LiTFSI), LiN(SO$_2$F)$_2$ (lithium bis(fluorosulfonyl)imide, LiFSI), LiCF$_3$SO$_3$, LiAsF$_6$, LiSbF$_6$, LiClO$_4$ or any mixture thereof. For example, the lithium salt may be a lithium imide salt. Examples of the lithium imide salt may include lithium bis(trifluoromethanesulfonyl)imide (LiTFSI, LiN(SO$_2$CF$_3$)$_2$) and lithium bis(fluorosulfonyl)imide (LiFSI, LiN(SO$_2$F)$_2$). The lithium salt appropriately maintains chemical reactivity with the ionic liquid, thereby maintaining or improving ionic conductivity.

In the composite electrolyte layer, the ionic liquid may include a cation represented by Formula 2, Formula 3, or a combination thereof.

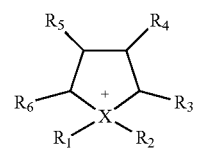

Formula 2

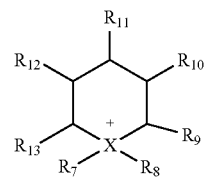

Formula 3

In Formulae 2 and 3, X may be independently N or P; R$_1$, R$_2$, R$_7$, and R$_8$ may each independently be a substituted or unsubstituted C1-C30 alkyl group or a substituted or unsubstituted C2-C20 alkenyl group; R$_3$, R$_4$, R$_5$, R$_6$, R$_9$, R$_{10}$, R$_{11}$, R$_{12}$, and R$_{13}$ may each independently be hydrogen, halogen, a hydroxyl group, a cyano group, —C(=O)R$_a$, —C(=O)OR$_a$, —OCO(OR$_a$), —C=N(R$_a$), —SR$_a$, —S(=O)R$_a$, —S(=O)$_2$R$_a$, —OR$_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or any combination thereof, wherein each R$_a$ is independently hydrogen, a C1-C10 alkyl group, or a C6-C20 aryl group; and at least one of R$_1$ and R$_2$ is an unsubstituted C1-C10 alkyl group, and at least one of R$_7$ and R$_8$ is an unsubstituted C1-C10 alkyl group.

For example, in Formulae 2 and 3, at least one of R$_1$ and R$_2$ may be an unsubstituted C3-C10 alkyl group, and at least one of R$_7$ and R$_8$ may be an unsubstituted C3-C10 alkyl group. The term "substituted" used in Formulae 2 and 3 are as described above, and thus detailed descriptions thereof will not be given.

In the composite electrolyte layer, the anion of the ionic liquid may include BF$_4^-$, AsF$_6^-$, SbF$_6^-$, AlCl$_4^-$, HSO$_4^-$, $ClO_4^-$, $CH_3SO_3^-$, $CF_3CO_2^-$, $(CF_3SO_2)_3C^-$, $NO_3^-$, $CH_3COO^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $C_2N_3^-$, and $(O(CF_3)_2C_2(CF_3)_2O)_2PO^-$, $(FSO_2)_2N^-$, $(CF_3SO_2)_2N^-$, or combination thereof.

The composite electrolyte layer may further include a polymer ionic liquid. Since a composition of the polymer ionic liquid is as described above, detailed descriptions thereof will not be given.

Lithium Metal Battery

Figure 2A:
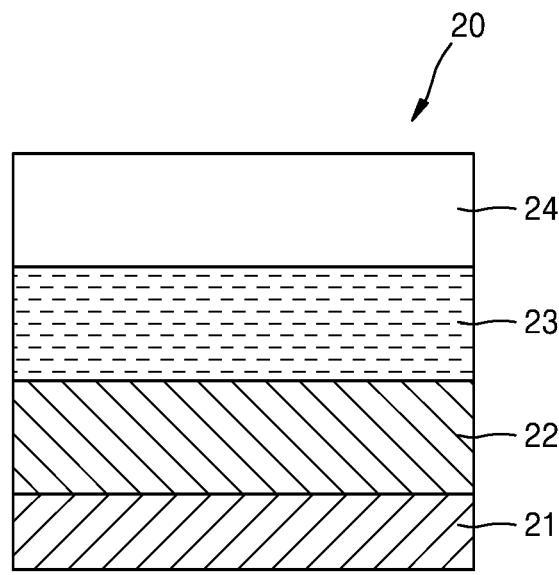
FIGS. 2A and 2B are schematic views illustrating structures of lithium metal batteries according to an embodiment.
Figure 2B:
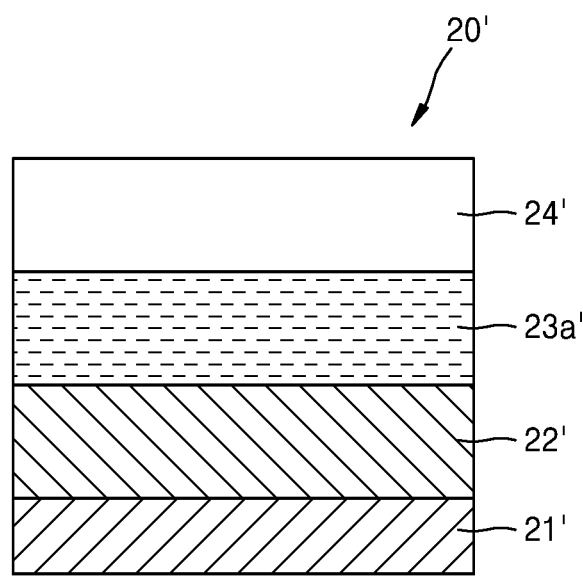

FIGS. 2A and 2B are schematic diagrams illustrating structures of lithium metal batteries 20 and 20' according to one or more embodiments.

Referring to FIGS. 2A and 2B, the lithium metal battery 20 or 20' has a structure in which a cathode current collector 21 or 21', a cathode active material layer 22 or 22', a composite electrolyte layer 23 or a polymer ionic liquid-containing composite electrolyte layer 23a', and an anode 24 or 24' are sequentially stacked, respectively. Optionally, an intermediate layer (not shown) may further be interposed between the composite electrolyte layer 23 and the anode 24 or between the polymeric ionic liquid-containing composite electrolyte layer 23a' and the anode 24'. For example, the intermediate layer (not shown) may be a separator. The separator may include polyethylene, polypropylene, or polyvinylidene fluoride, or have a multi-layered structure including two or more thereof. The separator may be a mixed multi-layered separator such as a polyethylene/polypropylene double-layered separator, a polyethylene/polypropylene/polyethylene triple-layered separator, a polypropylene/polyethylene/polypropylene triple-layered separator. The separator may further include an electrolyte including a lithium salt and an organic solvent.

Figure 3:
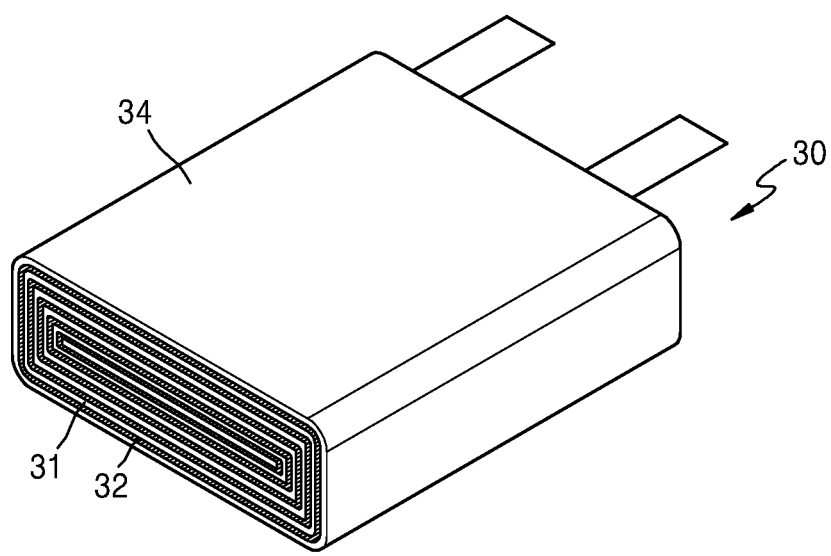
FIG. 3 is a schematic view illustrating a structure of a lithium metal battery according to an embodiment.

FIG. 3 is a schematic diagram illustrating a structure of a lithium metal battery 30 according to an embodiment.

Referring to FIG. 3, a lithium metal battery 30 includes a cathode 31 and an anode 32 and further includes a battery can 34 accommodating the cathode 31 and the anode 32.

The cathode 31 may include the above-described composite cathode. The composite cathode 31 may be prepared by coating a cathode active material and the composite electrolyte on a surface of a cathode current collector formed of aluminum or the like. Alternatively, the composite cathode 31 may be prepared by casting the cathode active material and the composite electrolyte on a separate support and laminating a cathode active material film separated from the support on a current collector.

The anode 32 may include lithium metal or a lithium alloy. The lithium alloy includes lithium and a metal/metalloid alloyable with lithium or an oxide thereof. The metal/metalloid alloyable with lithium or an oxide thereof may be Si, Sn, Al, Ge, Pb, Bi, Sb, an Si—Y' alloy (where Y' is alkali metal, alkali earth metal, a Group 13 to 16 element, transition metal, a rare earth element, or any combination thereof (except for Si)), or an Sn—Y' alloy (where Y' is alkali metal, alkali earth metal, elements of Groups 13 to 16, transition metal, rare earth element, or any combination thereof (except for Sn)), or $MnO_x$ ($0<x\leq2$).

The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or any combination thereof. For example, the oxide of the metal/metalloid alloyable with lithium may be lithium titanium oxide, vanadium oxide, lithium vanadium oxide, $SnO_2$, $SiO_x$ ($0<x<2$), or the like.

Optionally, a protective layer (not shown) may be formed on the anode 32. A thickness of the protective layer may be 5 micrometers (μm) or less. The protective layer may be a solid-type protective layer.

The above-described composite electrolyte layer may be interposed between the cathode 31 and the anode 32.

The lithium metal battery may be formed, for example, in a unit cell having a cathode/separator/anode structure, a bi-cell having a cathode/separator/anode/separator/cathode structure, or a stacked battery having a structure in which a unit cell is repeated, but embodiments are not limited thereto.

The lithium metal battery may be a lithium primary battery or a lithium secondary battery. For example, the lithium metal battery may be a lithium metal secondary battery. However, the shapes of the batteries are not particularly limited and the lithium metal battery may have a coin, button, sheet, stack, cylindrical, thin-film, or horn shape. Also, the lithium metal battery may be applied to larger-sized batteries used in electric vehicles, or the like. For example, the lithium metal battery may be used in hybrid vehicles such as plug-in hybrid electric vehicles (PHEVs). Also, the lithium metal battery may be used in applications requiring a large amount of power storage. For example, the lithium metal battery may be used in E-bikes and electric tools.

A method of preparing the composite electrolyte according to another embodiment includes combining a lithium salt, a solid electrolyte, wherein the solid electrolyte is a sulfide solid electrolyte, an oxide solid electrolyte, or a combination thereof, and an ionic liquid. For example, the lithium salt and the solid electrolyte can be added to the ionic liquid. The term "adding" is broadly used herein to include immersing, or the like.

Alternatively, a composite cathode precursor can be prepared that includes the cathode active material layer precursor including a plurality of solid electrolyte particles and a plurality of cathode active material particles. The ionic liquid can then be added to the cathode active material layer precursor to form the composite cathode.

For example, according to an embodiment for the method of preparing the composite electrolyte, the ionic liquid may be filled or disposed in the pores between particles of the sulfide solid electrolyte and the oxide solid electrolyte by immersing the solid electrolyte, wherein the solid electrolyte is the sulfide solid electrolyte, the oxide solid electrolyte, a combination thereof, in an electrolyte prepared by adding the lithium salt to the ionic liquid. This method of preparing the composite electrolyte is suitable for mass production due to easiness thereof.

Hereinafter, the present disclosure will be described in more detail according to the following examples and comparative examples. However, the following examples are merely presented to exemplify the present disclosure, and the scope of the present disclosure is not limited thereto.

EXAMPLES

Preparation of Composite Electrolyte

Example 1: Preparation of Composite Electrolyte $Li_2S$ powder (Sigma Aldrich, 99%), $P_2S_5$ powder (Sigma Aldrich, 99%), and LiCl powder (Acros Organic, 99%) were respectively weighed in a stoichiometric molar ratio and mixed. The mixture was mechanically milled using zirconia balls and then subjected to high energy ball milling at a rotation speed of 600 rpm for about 20 hours to obtain a pulverized mixture. The pulverized mixture was placed in an electric auto clave under an argon atmosphere and annealed at 550° C. for about 5 hours to obtain a $Li_6PS_5Cl$ sulfide solid electrolyte.

The obtained $Li_6PS_5Cl$, as a sulfide solid electrolyte, was immersed in a mixed electrolyte of 1-methyl-1-propylpyrrolidinium bis(fluorosulfonyl)imide (PY1,3-FSI, having a dielectric constant of 13.02), as an ionic liquid, and 1 M of lithium bis(fluorosulfonyl)imide (LiFSI), as a lithium salt, to prepare a composite electrolyte. In the composite electrolyte, a weight ratio of the ionic liquid to the sulfide solid electrolyte was 10:90. The dielectric constant of a mixture of the ionic liquid of PY1,3-FSI and the lithium salt of LiFSI was about 6.0 when measured by a 2-probe method at room temperature (25° C.) using an amplitude of 10 millivolts (mV) and a frequency of about 915 megahertz (MHz).

Example 2: Preparation of Composite Electrolyte

A composite electrolyte was prepared in the same manner as in Example 1, except that the weight ratio of the ionic liquid to the sulfide solid electrolyte in the composite electrolyte was 50:50 instead of 10:90.

Example 3: Preparation of Composite Electrolyte

A composite electrolyte was prepared in the same manner as in Example 1, except that a mixed electrolyte of PY1,3-FSI, as the ionic liquid, and 2 M of lithium bis(trifluoromethanesulfonyl)imide (LiTFSI), as the lithium salt, were used instead of the mixed electrolyte of PY1,3-FSI having a dielectric constant of 13.02, as the ionic liquid, and 1 M of LiFSI, as the lithium salt.

Comparative Example 1: Preparation of Electrolyte

A sulfide solid electrolyte was prepared in the same manner as in Example 1, except that the mixed weight ratio of the ionic liquid to the sulfide solid electrolyte in the composite electrolyte was 0:100 instead of 10:90.

Comparative Example 2: Preparation of Electrolyte

An ionic liquid-containing electrolyte was prepared in the same manner as in Example 1, except that the mixed weight ratio of the ionic liquid to the sulfide solid electrolyte in the composite electrolyte was 100:0 instead of 10:90.

Comparative Example 3: Preparation of Composite Electrolyte

A composite electrolyte was prepared in the same manner as in Example 1, except that a mixed electrolyte of 1-ethyl-3-methylimidazolium bis(fluorosulfonyl)imide (EMI-FSI, having a dielectric constant of 14.63) and 1 M of LiFSI was used instead of the mixed electrolyte of PY1,3-FSI having a dielectric constant of 13.02, as the ionic liquid, and 1 M of LiFSI, as the lithium salt.

Comparative Example 4: Preparation of Composite Electrolyte

A composite electrolyte was prepared in the same manner as in Example 1, except that a mixed electrolyte of EMI-FSI having a dielectric constant of 14.63, as the ionic liquid, and 2 M of LiFSI, as the lithium salt, was used instead of the mixed electrolyte of PY1,3-FSI having a dielectric constant of 13.02, as the ionic liquid, and 1 M of LiFSI, as the lithium salt.

Preparation of Composite Cathode

Example 4: Preparation of Composite Cathode

A composite cathode was prepared according to the following process. In addition, all the procedures of the composite cathode were performed in an inert gas atmosphere.

$LiNi_{0.8}Co_{0.1}Mn_{0.1}O_2$, as a cathode active material, the composite electrolyte prepared according to Example 1, and carbon black (Super-P, Timcal Ltd.), as a conducting agent, were uniformly mixed in a weight ratio of 60:30:10 in a mortar to prepare a cathode active material layer composition (cathode mixture). 200 mg of the cathode active material layer composition (cathode mixture) was inserted into a molding jig and press-molded at a pressure of 7 ton/cm$^2$ to form the cathode active material layer composition (cathode mixture) into pellets. The pelletized cathode active material layer composition (cathode mixture) was laminated on an aluminum thin film, as a cathode current collector, to prepare a composite cathode having a cathode active material layer.

Example 5: Preparation of Composite Cathode

A composite cathode was prepared in the same manner as in Example 4, except that $LiNi_{0.8}Co_{0.1}Mn_{0.1}O_2$, as the cathode active material, the composite electrolyte prepared according to Example 2, and carbon black (Super-P, Timcal Ltd.), as the conductive material were used, in a weight ratio of 90:8:2 instead of 60:30:10. A mixture density of the composite cathode was 3.05 grams per cubic centimeter (g/cm$^3$).

Example 6: Preparation of Composite Cathode

A composite cathode was prepared in the same manner as in Example 4, except that the composite electrolyte prepared according to Example 3 was used.

Comparative Example 5: Preparation of Composite Cathode

A composite cathode was prepared in the same manner as in Example 4, except that the electrolyte prepared according to Comparative Example 1 was used.

Comparative Example 6: Preparation of Composite Cathode

A composite cathode was prepared in the same manner as in Example 4, except that $LiNi_{0.8}Co_{0.1}Mn_{0.1}O_2$, as the cathode active material, the electrolyte prepared according to Comparative Example 1, and carbon black (Super-P, Timcal Ltd.), as the conducting agent, were used in a weight ratio of 90:8:2 instead of using $LiNi_{0.8}Co_{0.1}Mn_{0.1}O_2$, as the cathode active material, the composite electrolyte prepared according to Example 1, carbon black (Super-P, Timcal Ltd.), as the conducting agent, in the weight ratio of 60:30:10. A mixture density of the composite cathode was 2.87 g/cm$^3$.

Comparative Example 7: Preparation of Composite Cathode

A composite cathode was prepared in the same manner as in Example 4, except that the electrolyte prepared according to Comparative Example 2 was used.

Comparative Example 8: Preparation of Composite Cathode

A composite cathode was prepared in the same manner as in Example 4, except that the composite electrolyte prepared according to Comparative Example 3 was used.

Comparative Example 9: Preparation of Composite Cathode

A composite cathode was prepared in the same manner as in Example 4, except that the composite electrolyte prepared according to Comparative Example 4 was used.

Preparation of Lithium Metal Battery

Example 7: Preparation of Lithium Metal Battery

A lithium metal battery was prepared according to the following process. In addition, all the procedures of the lithium metal battery were performed in an inert gas atmosphere.

The composite cathode according to Example 4 and the composite electrolyte layer of the composite electrolyte according to Example 1 were inserted into a molding jig and press-molded at a pressure of 7 ton/cm$^2$ to integrate the composite electrolyte layer with the composite cathode.

Subsequently, a lithium metal thin film (having a thickness of about 20 μm) formed on a copper thin film, as an anode current collector, was inserted into the molding jig and press-molded at a pressure of 7 ton/cm$^2$ for integration with the composite electrolyte layer formed on the composite cathode to prepare a lithium metal battery for tests.

Examples 8 and 9: Preparation of Lithium Metal Battery

Lithium metal batteries for tests were prepared in the same manner as in Example 7, except that the composite cathodes according to Examples 5 and 6 were used instead of the composite cathode according to Example 4.

Comparative Examples 10 to 14: Preparation of Lithium Metal Battery

Lithium metal batteries for tests were prepared in the same manner as in Example 7, except that the composite cathodes according to Comparative Examples 5 to 9 were used instead of the composite cathode according to Example 4.

Analysis of Composite Electrolyte and Evaluation of Cell Resistance

Analysis Example 1: X-ray Diffraction (XRD)

The composite electrolytes or the electrolytes according to Example 3 and Comparative Examples 1 to 3 were pressed at a pressure of 7 ton/cm$^2$ to obtain pellets having a diameter of about 0.9 mm and a thickness of about 1 mm. The pellets were maintained (i.e., held at an open circuit voltage) for 24 hours and subjected to X-ray diffraction (XRD) analysis using CuKα radiation. The results are shown in FIG. 4.

X-ray-diffraction was performed using a Rigaku RINT2200HF+ diffractometer using Cu Kα radiation (1.540598 Å).

Figure 4:
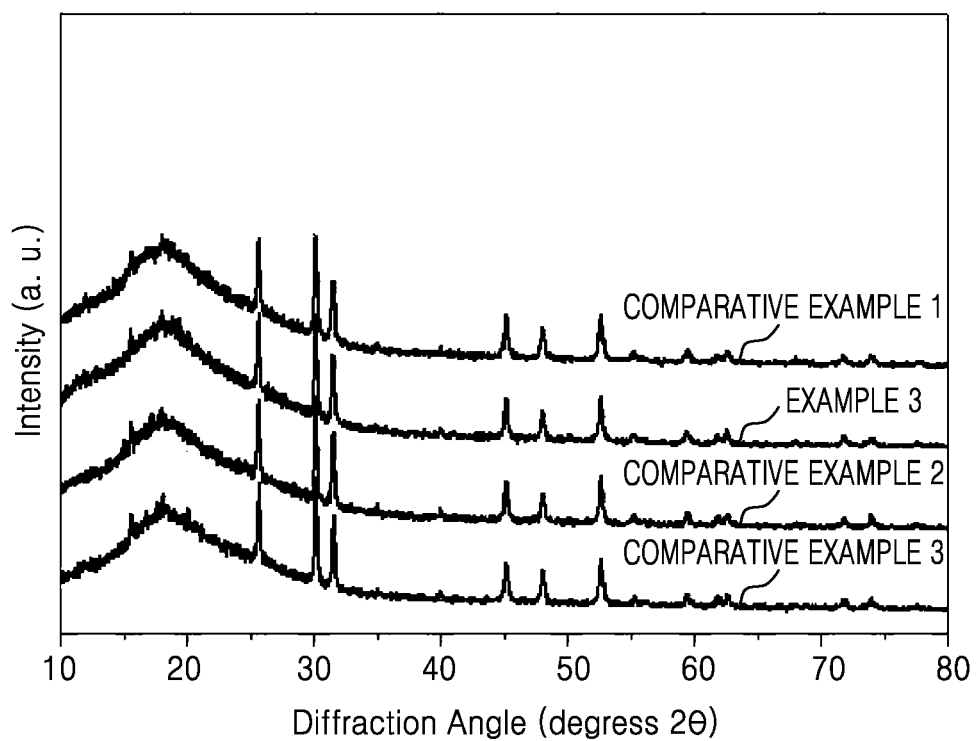
FIG. 4 is a graph of intensity (arbitrary units, a.u.) versus diffraction angle (degrees 2-theta, degrees 2θ), illustrating X-ray diffraction analysis results of composite electrolytes and electrolytes according to Example 3 and Comparative Examples 1 to 3.

Referring to FIG. 4, it was confirmed that a Bragg diffraction angle (degrees 2 theta, 2θ) value of the composite electrolyte according to Example 3 indicating a peak position was not changed when compared with the electrolytes or composite electrolytes according to Comparative Examples 1 to 3. Thus, no chemical changes were observed in the composite electrolyte according to Example 3 when compared with the electrolytes or composite electrolytes according to Comparative Examples 1 to 3.

Analysis Example 2: Raman Spectroscopy

The composite electrolytes or the electrolytes according to Example 3 and Comparative Examples 1 to 3 were pressed at a pressure of 7 ton/cm$^2$ to obtain pellets having a diameter of about 0.9 mm and a thickness of about 1 mm. The pellets were maintained (i.e., held at an open circuit voltage) for 24 hours and subjected to Raman spectroscopy. The results are shown in FIG. 5.

Raman spectroscopy was performed using a RM-1000 Invia device (514 nm, Ar$^+$ ion laser, Renishaw).

Figure 5:
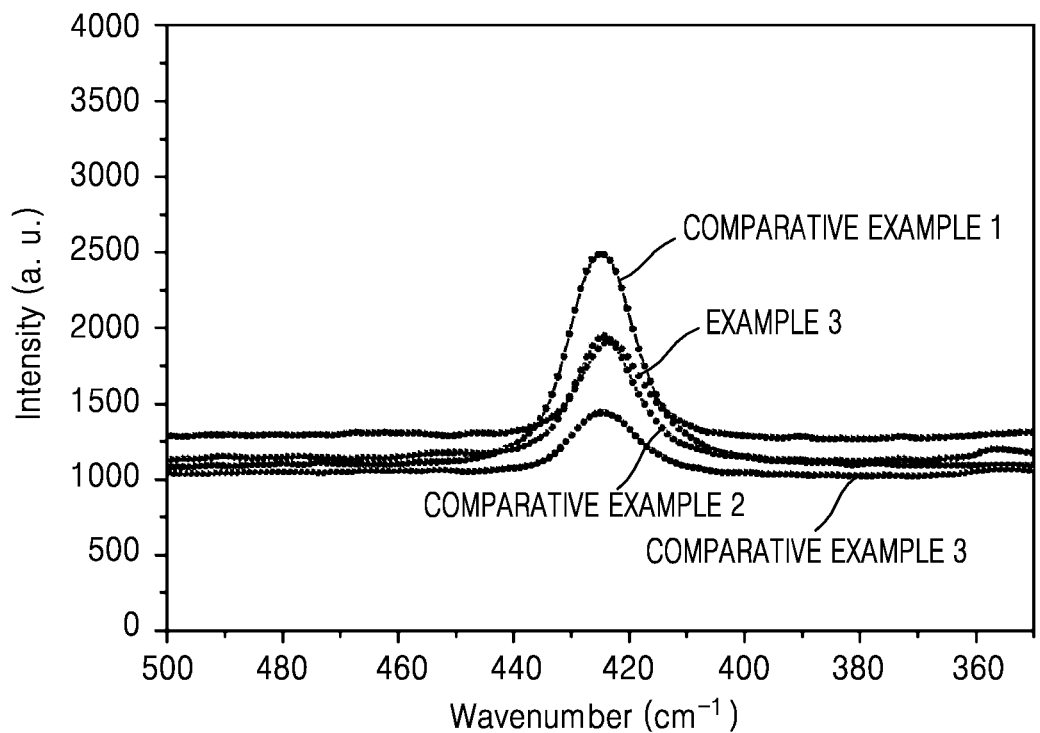
FIG. 5 is a graph of intensity (a.u.) versus wavenumber (inverse centimeters, $cm^{-1}$), illustrating Raman spectroscopy results of composite electrolytes and electrolytes according to Example 3 and Comparative Examples 1 to 3.

Referring to FIG. 5, maximum absorption peaks were obtained at a Raman shift of about 425 inverse centimeters (cm$^{-1}$) in the composite electrolytes and electrolytes according to Example 3 and Comparative Examples 1 to 3. The maximum absorption peak obtained at about 425 cm$^{-1}$ is related to destruction of $(PS_4)^{3-}$ anions. Thus, it may be confirmed that there were no changes in chemical structures of the composite electrolytes and the electrolytes according to Example 3 and Comparative Examples 1 to 3.

Analysis Example 3: Ion Chromatography

Amounts of Cl$^-$ anions detected from decomposition products of the composite electrolytes according to Examples 1 and 3 and Comparative Examples 3 and 4 with respect to time (i.e., amounts of Cl$^-$ anions eluted from the composite electrolytes) were evaluated by ion chromatography. The results are shown in Table 1 below, where the amount of anions eluted is reported in parts per million (ppm) by weight, based on the total weight of the composite electrolyte.

The ion chromatography was performed by extracting each of the composite electrolytes according to Examples 1 and 3 and Comparative Examples 3 and 4 using a syringe after about 24 hours, and filtering the composite electrolyte using a polyvinylidene fluoride (PVdF) filter (pore size of 0.45 μm, Sigma Aldrich). The ion chromatography was performed using a Dionex ICS-5000+ HPIC system (Thermoscientific, San Jose, Calif.).

TABLE 1

|  | Amount of Cl$^-$ anions eluted from composite electrolyte (ppm) |
| --- | --- |
| Example 1 | 2.7 |
| Example 3 | 4.95 |
| Comparative Example 3 | 73.62 |
| Comparative Example 4 | 33.07 |

Referring to Table 1, the amounts of Cl⁻ anions eluted from the composite electrolytes according to Examples 1 and 3 were far lower than those of the comparative composite electrolytes according to Comparative Examples 3 and 4. In addition, the amounts of the Cl⁻ anions eluted from the composite electrolytes according to Examples 1 and 3 were only 2.7 ppm and 4.95 ppm, respectively, which were less than 10 ppm.

Evaluation Example 1: Ionic Conductivity

Figure 6:
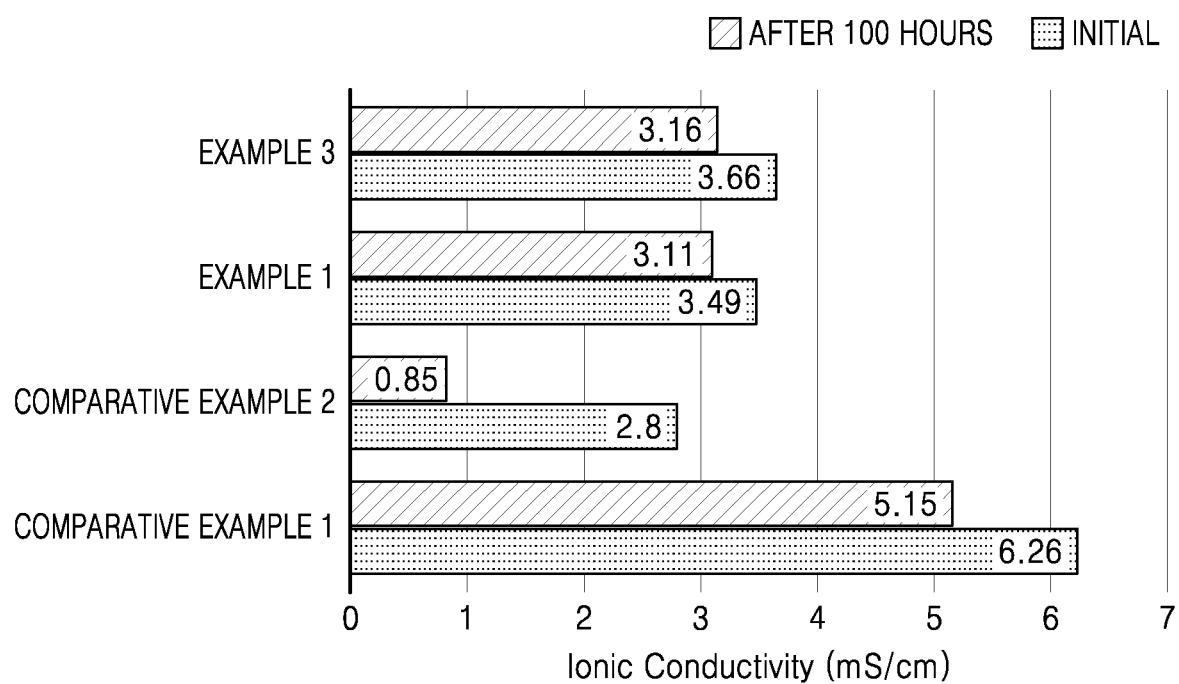
FIG. 6 is a bar chart illustrating ionic conductivity evaluation results of composite electrolytes and electrolytes according to Examples 1 and 3 and Comparative Examples 1 and 2.

The composite electrolytes or the electrolytes according to Examples 1 and 3 and Comparative Examples 1 and 2 were pressed at a pressure of 7 ton/cm² to obtain pellets having a diameter of about 0.9 mm and a thickness of about 1 mm. Ionic conductivity of the pellets before (initial) and after being maintained for 100 hours is measured. As used herein, the term "maintained" means held at an open circuit voltage. The results are shown in FIG. 6 and Table 2. Ionic conductivity is reported as millisiemens per centimeter (mS/cm).

Ionic conductivity was evaluated by measuring resistivity by applying a voltage bias of 10 mV within a frequency range of from about 0.1 Hz to about 1 MHz while scanning temperature, and converting resistivity to ionic conductivity. Evaluation of ionic conductivity was performed using an ionic conductivity reduction ratio (%) expressed by Equation 1 below.

ionic conductivity reduction ratio (%)=[(initial ionic conductivity−ionic conductivity after being maintained for 100 hours)/(initial ionic conductivity)]×100     Equation 1

TABLE 2

| | Initial ionic conductivity (mS/cm) | Ionic conductivity after 100 hours (mS/cm) | Ionic conductivity reduction ratio (%) |
|---|---|---|---|
| Example 1 | 3.49 | 3.11 | 11 |
| Example 3 | 3.66 | 3.16 | 14 |
| Comparative Example 1 | 6.26 | 5.15 | 18 |
| Comparative Example 2 | 2.8 | 0.85 | 70 |

Referring to FIG. 6 and Table 2, the composite electrolytes according to Examples 1 and 3 had lower ionic conductivity reduction ratios than the electrolytes according to Comparative Examples 1 and 2. All of the ionic conductivity reduction ratios of the composite electrolytes according to Examples 1 and 3 were less than 15%.

Evaluation Example 2: Impedance—Evaluation of Interfacial Resistance

Impedance characteristics of the lithium metal batteries for tests according to Comparative Example 10 and Example 7 were evaluated.

Figure 7A:
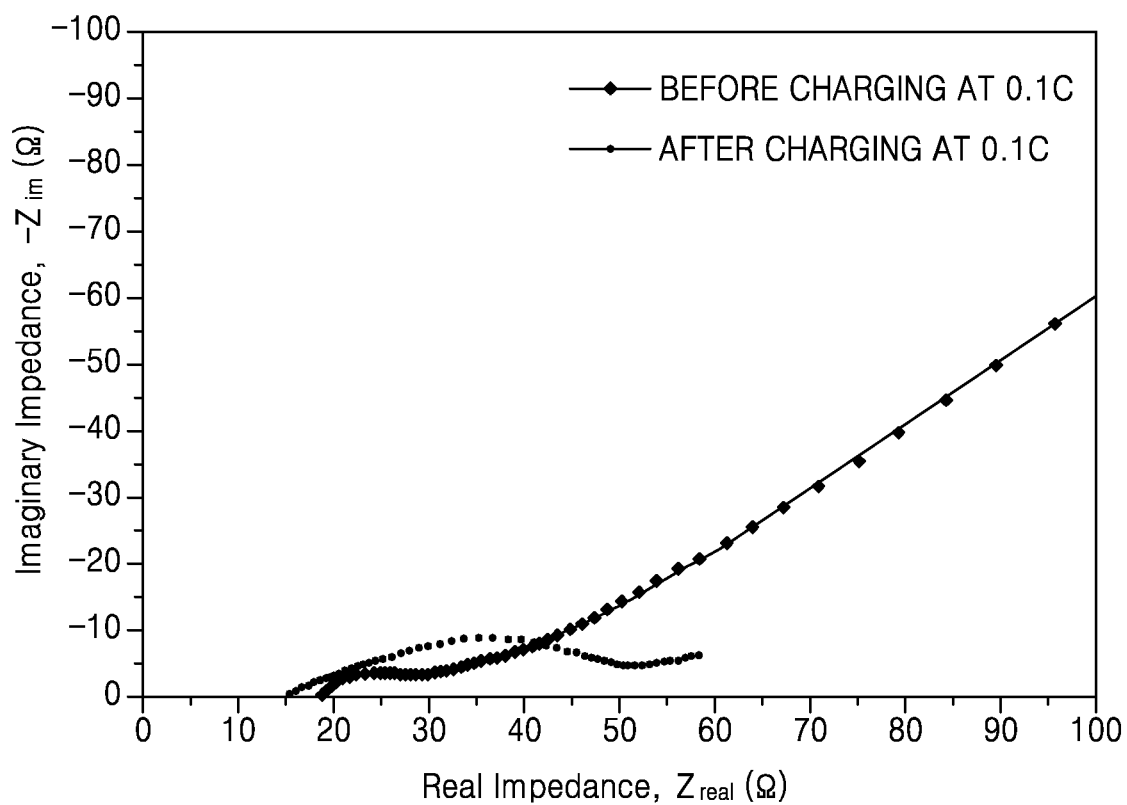
FIG. 7A is a graph of imaginary impedance ($-Z_{im}$, ohms) versus real impedance ($Z_{real}$, ohms) showing impedance evaluation results of a lithium metal battery for tests according to Comparative Example 10.
Figure 7B:
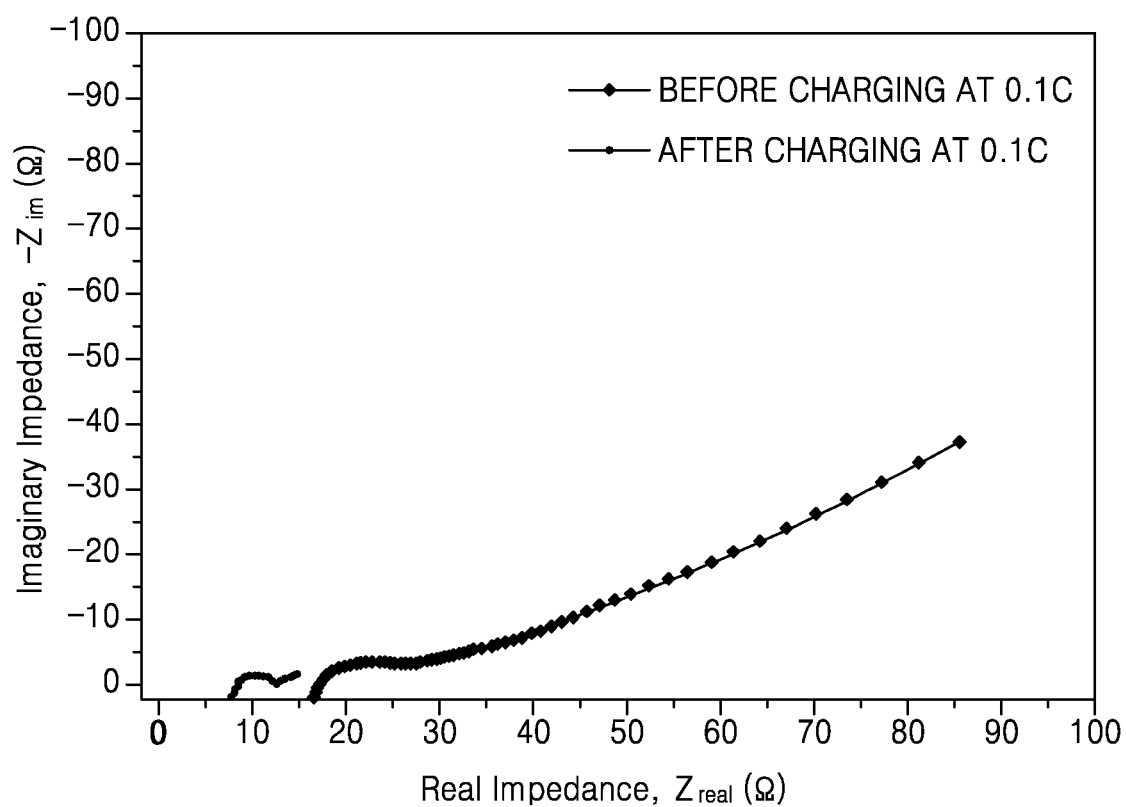
FIG. 7B is a graph of imaginary impedance ($-Z_{im}$, ohms) versus real impedance ($Z_{real}$, ohms) showing impedance evaluation results of a lithium metal battery for tests according to Example 7.

Initial impedances of the lithium metal batteries for tests according to Comparative Example 10 and Example 7 were evaluated by measuring resistances while applying a voltage bias of 10 mV at 25° C. in a frequency range of from about $10^6$ Hz to about 0.1 MHz according to a 2-probe method using an impedance analyzer (Solartron 1260A Impedance/Gain-Phase Analyzer). Then, the lithium metal batteries for tests were each charged in a constant current mode at a rate of 0.1 C under the same conditions and impedances thereof were measured. The results of Nyguist plots are shown in FIGS. 7A and 7B, respectively. In FIGS. 7A and 7B, interfacial resistances of the composite cathodes and the electrolyte or composite electrolyte are determined based on positions and sizes of semicircles.

Referring to FIGS. 7A and 7B, while an initial interfacial resistance of the lithium metal battery for tests according to Example 7 was similar to that of the lithium metal battery for tests according to Comparative Example 10 (before charging at a rate of 0.1 C), an interfacial resistance of the lithium metal battery according to Example 7 after charging at the rate of 0.1 C was reduced to about ⅛ of that of the lithium metal battery for tests according to Comparative Example 10.

According to the composite electrolyte and the method of preparing the composite electrolyte according to the present disclosure, chemical reactions with the electrolyte may be reduced to maintain or improve ionic conductivity. Therefore, the composite cathode and the lithium metal battery each including the composite electrolyte may have increased energy density and discharge capacity and improved high-rate characteristics and lifespan characteristics.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite electrolyte, comprising:
   a lithium salt;
   a solid electrolyte, wherein the solid electrolyte is a sulfide solid electrolyte, an oxide solid electrolyte, or a combination thereof, and the solid electrolyte has halogen ions; and
   an ionic liquid,
   wherein a mixture of the ionic liquid and the lithium salt has a dielectric constant of from about 4 to about 12, and
   an amount of halogen ions eluted from the composite electrolyte after immersion of the solid electrolyte in the ionic liquid and the lithium salt for 24 hours is less than about 10 parts per million by weight, based on the total weight of the composite electrolyte, as measured by ion chromatography.

2. The composite electrolyte of claim 1, wherein an amount of the lithium salt in the ionic liquid is about 1 mole per liter or greater.

3. The composite electrolyte of claim 1, wherein the lithium salt is LiSCN, LiN(CN)₂, Li(CF₃SO₂)₃C, LiC₄F₉SO₃, LiN(SO₂CF₂CF₃)₂, LiCl, LiF, LiBr, LiI, LiB(C₂O₄)₂, LiBF₄, LiBF₃(C₂F₅), LiBF₂(C₂O₄), LiN(SO₂CF₃)₂, LiN(SO₂F)₂, LiCF₃SO₃, LiAsF₆, LiSbF₆, LiClO₄, or a combination thereof.

4. The composite electrolyte of claim 1, wherein a weight ratio of the solid electrolyte to the ionic liquid is from about 0.1:99.9 to about 90:10.

5. The composite electrolyte of claim 1, wherein the solid electrolyte is a sulfide solid electrolyte or a combination of the sulfide electrolyte with the oxide electrolyte, and the sulfide solid electrolyte comprises a solid electrolyte represented by Formula 1:

$Li_aM_bPS_cA_d$     Formula 1 wherein, in Formula 1,
$0<a\leq6$, $0\leq b\leq6$, $0<c<6$, and $0\leq d\leq6$;
M is Ge, Sn, or Si; and
A is F, Cl, Br, or I.

6. The composite electrolyte of claim 1, wherein the oxide solid electrolyte is $Li_{1+x}Ti_{2-x}Al(PO_4)_3$ wherein $0\leq x\leq4$, $Li_{1+x+y}Al_xTi_{2-x}Si_yP_{3-y}O_{12}$ wherein $0<x<2$ and $0\leq y<3$, $BaTiO_3$, $Pb(Zr_{1-a}Ti_a)O_3$ wherein $0\leq a\leq1$, $Pb_{1-x}La_xZr_{1-y}Ti_yO_3$ wherein $0\leq x<1$ and $0\leq y<1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al_{1-a}Ga_a)_x(Ti_bGe_{1-b})_{2-x}Si_yP_{3-y}O_{12}$ wherein $0\leq a\leq1$, $0\leq b\leq1$, $0\leq x\leq1$, and $0\leq y\leq1$, $Li_xLa_yTiO_3$ wherein $0<x<2$ and $0<y<3$, $Li_2O$, $LiAlO_2$, $Li_2O$—$Al_2O_3$—$SiO_2$—$P_2O_5$—$TiO_2$—$GeO_2$, $Li_{3+x}La_3M_2O_{12}$ wherein M is Te, Nb, or Zr, or a combination thereof.

7. The composite electrolyte of claim 1, wherein the ionic liquid comprises a cation having a saturated 5-membered to 12-membered heterocyclic ring comprising a heteroatom in the heterocyclic ring, wherein the heteroatom is N, P, As, or a combination thereof.

8. The composite electrolyte of claim 1, wherein the ionic liquid comprises a cation represented by Formula 2, Formula 3, or a combination thereof:

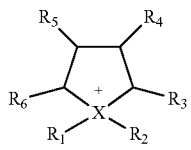

Formula 2

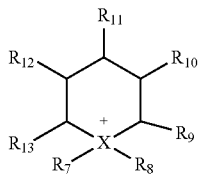

Formula 3 wherein, in Formulae 2 and 3,
X is independently N or P;
$R_1$, $R_2$, $R_7$, and $R_8$ are each independently a substituted or unsubstituted C1-C30 alkyl group or a substituted or unsubstituted C2-C20 alkenyl group;
$R_3$, $R_4$, $R_5$, $R_6$, $R_9$, $R_{10}$, $R_{11}$, $R_{12}$, and $R_{13}$ are each independently hydrogen, halogen, a hydroxyl group, a cyano group, —C(=O)$R_a$, —C(=O)O$R_a$, —OCO(O$R_a$), —C=N($R_a$), —S$R_a$, —S(=O)$R_a$, —S(=O)$_2R_a$, —O$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof, wherein each $R_a$ is independently hydrogen, a C1-C10 alkyl group, or a C6-C20 aryl group; and
at least one of $R_1$ and $R_2$ is an unsubstituted C1-C10 alkyl group, and
at least one of $R_7$ and $R_8$ is an unsubstituted C1-C10 alkyl group.

9. The composite electrolyte of claim 1, wherein the ionic liquid comprises an anion that is $BF_4^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_3C^-$, $NO_3^-$, $CH_3COO^-$, $Cl^-$, $Br^-$, $I^-$, $SO_4^{2-}$, $CF_3SO_3^-$, $(C_2F_5SO_2)_2$ $N^-$, $(C_2F_5SO_2)(CF_3SO_2)N^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $C_2N_3^-$, $(O(CF_3)_2C_2(CF_3)_2O)_2PO^-$, $(FSO_2)_2N^-$, $(CF_3SO_2)_2N^-$, or a combination thereof.

10. The composite electrolyte of claim 1, further comprising a liquid electrolyte, a polymer ionic liquid, or a combination thereof.

11. A lithium metal battery, comprising:
a composite cathode comprising a cathode current collector and a cathode active material layer, wherein the cathode active material layer is disposed on the cathode current collector and comprises a cathode active material and a composite electrolyte of claim 1;
a lithium anode comprising lithium metal or a lithium alloy; and
a composite electrolyte layer interposed between the cathode active material layer and the lithium anode, and comprising a lithium salt, an ionic liquid, and a solid electrolyte, wherein the solid electrolyte is a sulfide solid electrolyte, an oxide solid electrolyte, or a combination thereof.

12. The lithium metal battery of claim 11, wherein an amount of the cathode active material in the cathode active material layer is about 60 parts by weight or greater based on 100 parts by weight of the cathode active material layer.

13. The lithium metal battery of claim 11, wherein an amount of the composite electrolyte in the cathode active material layer is about 5 parts by weight or greater based on 100 parts by weight of the cathode active material layer.

14. The lithium metal battery of claim 11, wherein the cathode active material layer further comprises a conducting agent, a binder, or a combination of the conducting agent and the binder.

15. The lithium metal battery of claim 11, wherein the cathode active material layer comprises:
a plurality of cathode active material particles;
a plurality of solid electrolyte particles, wherein the plurality of solid electrolyte particles is intermixed with the plurality of cathode active material particles; and
a plurality of pores between adjacent particles of the cathode active material, between adjacent particles of the cathode active material and particles of the solid electrolyte, between adjacent particles of the solid electrolyte, or a combination thereof,
wherein the ionic liquid is disposed in at least one pore between the adjacent particles of the cathode active material, in at least one pore between the adjacent particles of the cathode active material and particles of the solid electrolyte, in at least one pore between the adjacent particles of the solid electrolyte, or a combination thereof.

16. The lithium metal battery of claim 11, wherein an ionic conductivity of the composite electrolyte of the cathode active material layer decreases by about 15% or less relative to an initial ionic conductivity after 100 hours at an open circuit voltage.

17. The lithium metal battery of claim 11, wherein an amount of the ionic liquid in the composite electrolyte layer is less than about 50 parts by weight based on 100 parts by weight of the composite electrolyte layer.

18. The lithium metal battery of claim 11, wherein the lithium salt of the composite electrolyte layer is LiSCN, LiN(CN)$_2$, Li(CF$_3$SO$_2$)$_3$C, LiC$_4$F$_9$SO$_3$, LiN(SO$_2$CF$_2$CF$_3$)$_2$, LiCl, LiF, LiBr, LiI, LiB(C$_2$O$_4$)$_2$, LiBF$_4$, LiBF$_3$(C$_2$F$_5$), LiBF$_2$(C$_2$O$_4$), LiN(SO$_2$CF$_3$)$_2$, LiN(SO$_2$F)$_2$, LiCF$_3$SO$_3$, LiAsF$_6$, LiSbF$_6$, LiClO$_4$, or a combination thereof.

19. The lithium metal battery of claim 11, wherein the ionic liquid in the composite electrolyte layer comprises a cation represented by Formula 2, Formula 3, or a combination thereof:

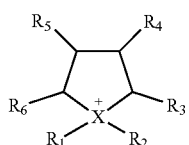

Formula 2

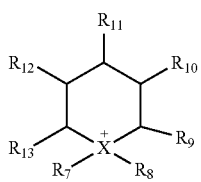

Formula 3 wherein, in Formulae 2 and 3,

X is N or P;

$R_1$, $R_2$, $R_7$, and $R_8$ are each independently a substituted or unsubstituted C1-C30 alkyl group or a substituted or unsubstituted C2-C20 alkenyl group;

$R_3$, $R_4$, $R_5$, $R_6$, $R_9$, $R_{10}$, $R_{11}$, $R_{12}$, and $R_{13}$ are each independently hydrogen, halogen, a hydroxyl group, a cyano group, —C(=O)$R_a$, —C(=O)O$R_a$, —OCO(O$R_a$), —C=N($R_a$), —S$R_a$, —S(=O)$R_a$, —S(=O)$_2R_a$, —O$R_a$, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C3-C30 cycloalkyl group, a substituted or unsubstituted C6-C30 aryl group, a substituted or unsubstituted C6-C30 aryloxy group, a substituted or unsubstituted C6-C30 heteroaryl group, or a combination thereof, wherein each $R_a$ is independently hydrogen, a C1-C10 alkyl group, or a C6-C20 aryl group; and at least one of $R_1$ and $R_2$ is an unsubstituted C1-C10 alkyl group, and at least one of $R_7$ and $R_8$ is an unsubstituted C1-C10 alkyl group.

20. The lithium metal battery of claim 11, wherein the ionic liquid of the composite electrolyte layer further comprises an anion that is BF$_4^-$, AsF$_6^-$, SbF$_6^-$, AlCl$_4^-$, HSO$_4^-$, ClO$_4^-$, CH$_3$SO$_3^-$, CF$_3$CO$_2^-$, (CF$_3$SO$_2$)$_3$C$^-$, NO$_3^-$, CH$_3$COO$^-$, Cl$^-$, Br$^-$, I$^-$, SO$_4^{2-}$, CF$_3$SO$_3^-$, (C$_2$F$_5$SO$_2$)$_2$N$^-$, (C$_2$F$_5$SO$_2$)(CF$_3$SO$_2$)N$^-$, (CF$_3$)$_3$PF$_3^-$, (CF$_3$)$_4$PF$_2^-$, (CF$_3$)$_5$PF$^-$, (CF$_3$)$_6$P$^-$, SF$_5$CF$_2$SO$_3^-$, SF$_5$CHFCF$_2$SO$_3^-$, CF$_3$CF$_2$(CF$_3$)$_2$CO$^-$, (CF$_3$SO$_2$)$_2$CH$^-$, (SF$_5$)$_3$C$^-$, C$_2$N$_3^-$, (O(CF$_3$)$_2$C$_2$(CF$_3$)$_2$O)$_2$PO$^-$, (FSO$_2$)$_2$N$^-$, (CF$_3$SO$_2$)$_2$N$^-$, or a combination thereof.

21. The lithium metal battery of claim 11, wherein the composite electrolyte layer further comprises a polymer ionic liquid.

22. A method of preparing the composite electrolyte of claim 1, the method comprising combining the lithium salt, the solid electrolyte, and the ionic liquid.

* * * * *